(12) United States Patent
Cherchi et al.

(10) Patent No.: US 8,064,741 B2
(45) Date of Patent: Nov. 22, 2011

(54) OPTICAL COUPLING DEVICE

(75) Inventors: Matteo Cherchi, Milan (IT); Giacomo Gorni, Milan (IT)

(73) Assignee: Mosaid Technologies Incorporated, Ottawa (CA)

( * ) Notice: Subject to any disclaimer, the term of this patent is extended or adjusted under 35 U.S.C. 154(b) by 1488 days.

(21) Appl. No.: 10/584,853

(22) PCT Filed: Dec. 29, 2003

(86) PCT No.: PCT/EP03/51108
§ 371 (c)(1),
(2), (4) Date: Jun. 28, 2006

(87) PCT Pub. No.: WO2005/064371
PCT Pub. Date: Jul. 14, 2005

(65) Prior Publication Data
US 2009/0245728 A1    Oct. 1, 2009

(51) Int. Cl.
*G02B 6/26* (2006.01)
(52) U.S. Cl. ............................. 385/28; 385/43
(58) Field of Classification Search .................... 385/43, 385/28
See application file for complete search history.

(56) References Cited

U.S. PATENT DOCUMENTS

| 6,310,995 | B1 | 10/2001 | Saini et al. |
| 6,396,984 | B1 | 5/2002 | Cho et al. |
| 2002/0118916 | A1 | 8/2002 | Lee et al. |
| 2003/0035633 | A1 | 2/2003 | Agarwal et al. |
| 2003/0053756 | A1 | 3/2003 | Lam et al. |

FOREIGN PATENT DOCUMENTS

| EP | 1 202 085 B1 | 5/2002 |
| GB | 2 317 023 A | 3/1998 |
| GB | 2 345 980 A | 7/2000 |

OTHER PUBLICATIONS

Yasuoka, N., "Semiconductor Light Guide," Patent Abstract of Japan of JP No. 04-283704, 2 Sheets, (Oct. 8, 1992).
R. Zengerle et al.; "Low-loss beamwidth transformers on InP with reduced requirements on lithographic resolution" Journal of Vacuum Science and Technology B, vol. 11, No. 6, pp. 2641-2644, (1993).

(Continued)

*Primary Examiner* — Jerry Rahill
(74) *Attorney, Agent, or Firm* — Don R. Mollick

(57) ABSTRACT

An optical mode converter has a coupling waveguide and a receiving waveguide. The coupling waveguide has at an input end a first effective refractive index and includes a tapered core of a substantially constant refractive index with a substantially square cross section at the input end, which has a size that tapers down moving away from the input end. The coupling waveguide also has a cladding at least partially surrounding the tapered core. The receiving waveguide has a second effective refractive index at an output end and includes a core of a substantially constant refractive index greater than the refractive index of the tapered core of the coupling waveguide and a cladding at least partially surrounding the core. A side surface of the tapered core of the coupling waveguide is optically in contact, in a coupling portion, with the receiving waveguide so as to allow optical coupling between the coupling waveguide and the receiving waveguide. The refractive index of the tapered core of the coupling waveguide is selected so that the first effective refractive index and the second effective refractive index differ from each other in absolute value less than 30% of the difference between the core refractive index and the effective refractive index of the receiving waveguide.

10 Claims, 11 Drawing Sheets

OTHER PUBLICATIONS

R. Zengerle. et al.; "Fabrication of optical beamwidth transformers for guided waves on InP using wedge-shaped taper structures", Journal of Vacuum Science and Technology B, vol. 9, No. 6, pp. 3459-3463, (1991).

R. Zengerle. et al.; "Laterally Tapered InP-InGaAsP Waveguides for Low-Loss Chip-to-Fiber Butt Coupling: A Comparison of Different Configurations", IEEE Photonics Technology Letters, vol. 7, No. 5, pp. 532-534, (1995).

R. S. Fan et al.; "Tapered Polymer Single-Mode Waveguides for Mode Transformation", Journal of Lightwave Technology, vol. 17, No. 3, pp. 466-474, (1999).

I. Moerman et al.; "A Review on Fabrication Technologies for the Monolithic Integration of Tapers with III-V Semiconductor Devices", IEEE Journal of Selected Topics in Quantum Electronics, vol. 3, No. 6, pp. 1308-1320, (1997).

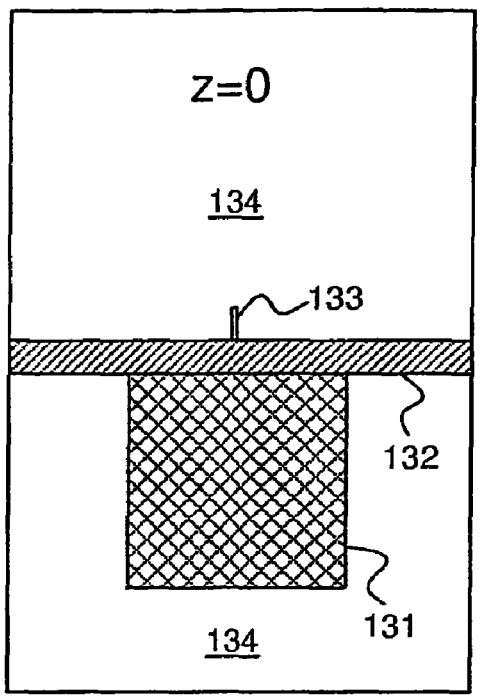
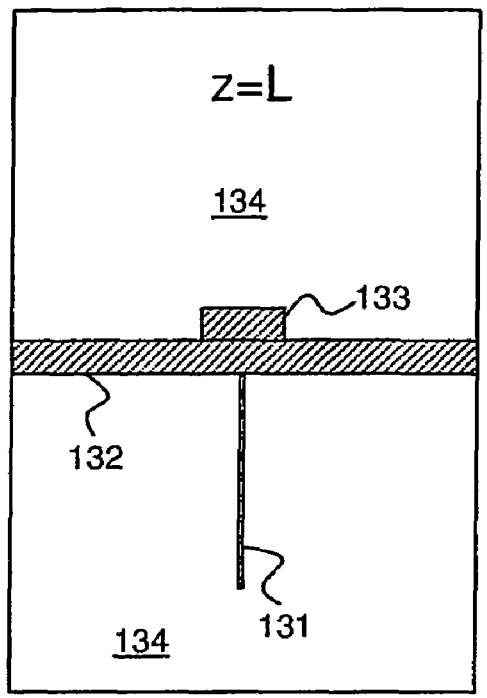
Fig. 13a　　　　　　　Fig. 13b
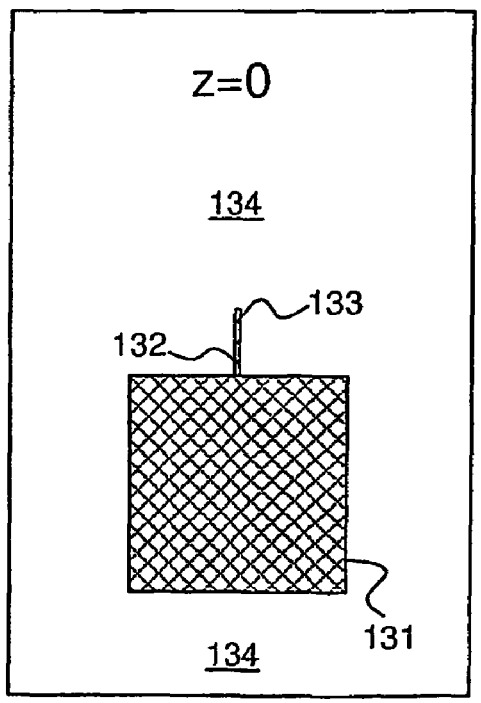
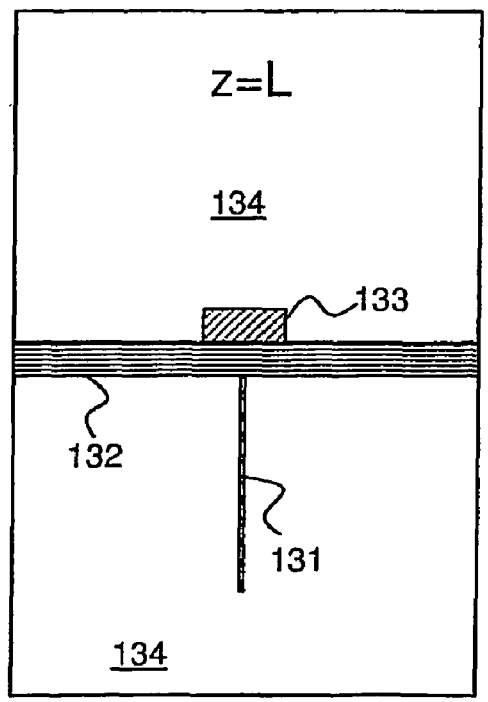
Fig. 14a　　　　　　　Fig. 14b

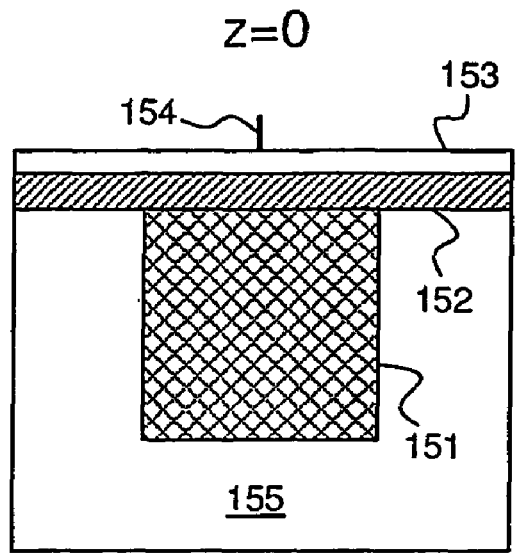
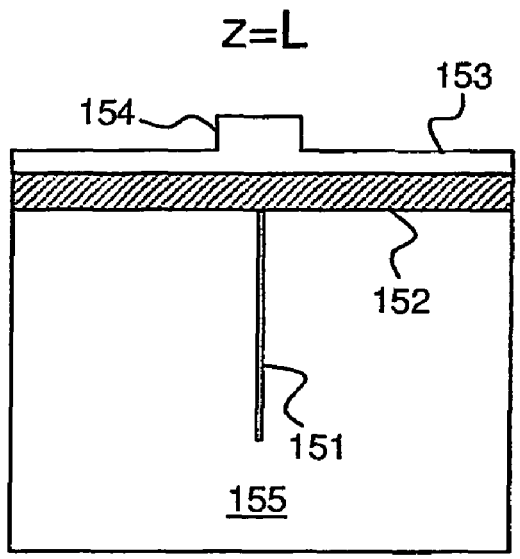
Fig. 15a                Fig. 15b
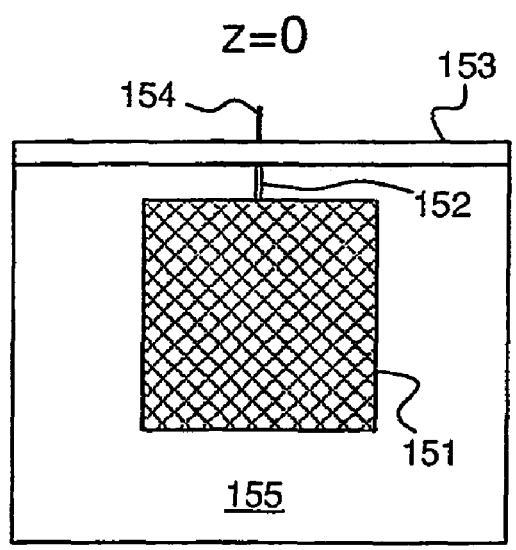
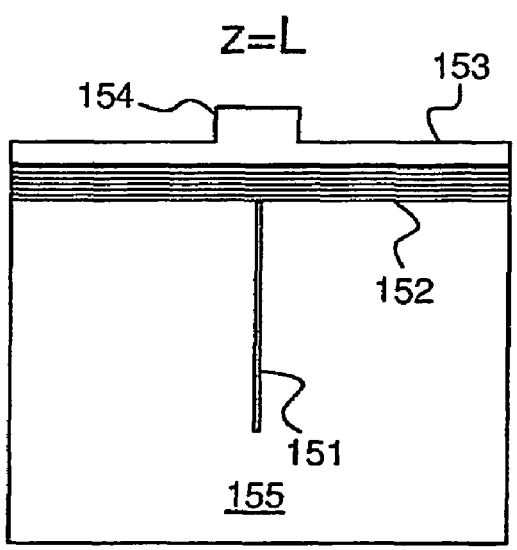
Fig. 16a                Fig. 16b

US 8,064,741 B2

OPTICAL COUPLING DEVICE

CROSS REFERENCE TO RELATED APPLICATION

This application is a national phase application based on PCT/EP2003/051108, filed December 29, 2003, the content of which is incorporated herein by reference.

BACKGROUND OF THE INVENTION

1. Field of the Invention

The present invention relates to an optical coupling device. In particular, the present invention relates to an optical mode converter between a first optical waveguide and a second optical waveguide in which the two waveguides have different characteristics from each other.

2. Description of the Related Art

Said optical waveguides may be fibers, for example optical fibers of transmission lines, or planar waveguides, or integrated waveguides, for example input/output waveguides of integrated optics devices such as the output waveguide of a semiconductor laser.

Preferably, said different characteristics are different dimensions of the waveguides and/or different refractive index steps between the core and the cladding of the waveguides and/or different absolute refractive indexes between the two waveguides.

An optical beam confined in an optical waveguide propagates with a predetermined mode shape, which depends on the absolute refractive index of said waveguide, on the refractive index step (or refractive index profile) between the core and the cladding of the waveguide and on the dimensions and shape of the waveguide.

The mode shape, or mode profile, defines at least one propagation mode, typically the propagation of the fundamental mode, of the optical beam into the waveguide. In two waveguides having different characteristics, the modes associated to each waveguide are different in shape and/or in dimensions. With reference to FIG. 17, to couple an optical beam propagating in the first (launching) waveguide 2, with a first mode, to a second (receiving) waveguide 3, the dimension and/or the shape of the first mode should be changed in a way to form a second mode which propagates in the second waveguide. Preferably, the coupling is realized by means of a coupling device 4 optically coupled to the first and to the second waveguide. The coupling device acts on the mode profile of first waveguide 2, for example elliptic or circular in cross section, in a way to change its dimension and/or shape in both of two orthogonal directions and make it similar to the mode profile of the second waveguide 3. With reference to the case where the waveguide receiving the beam is a planar waveguide, we shall indicate as "vertical" a direction orthogonal to the main planar surface of the waveguide device, as "horizontal" a direction parallel to the main planar surface of the waveguide device and orthogonal to the beam propagation direction. In case of symmetric coupling (e.g. non planar waveguides) "horizontal" and "vertical" stand for any two directions orthogonal to each other and to the beam propagation direction. "Over" and "under", "top" and "bottom", "upper" and "lower" shall have a correlative meaning.

Generally, a coupling device between two waveguides with different characteristic is desirable if the coupling loss between the two waveguides without use of a coupling device is more than 0.2 dB.

I. Moerman et al. in IEEE Journal of Selected Topics in Quantum Electronics, vol. 3, no. 6, December 1997, pp. 1308-1320 give a review of the fabrication technologies for the monolithic integration of tapers with III-V semiconductor devices, as well as of different taper designs and performances. According to this paper, many known mode size converters consist of overlapping waveguides with one waveguide being part of, or surrounded by, a second waveguide. The optical power is coupled from one waveguide to the other by means of a tapered transition region, in which on or both of the waveguides can be tapered. According to this paper, it is important that the taper angle in the transition region is sufficiently small, to prevent coupling of power from the fundamental mode into the higher order taper modes. In such overlapping waveguide structure it is possible to change the vertical waveguide structure just by changing the lateral dimensions along the tapered section and without changing layer thickness.

GB patent application N° 2,317,023 discloses a tapered rib waveguide tapering from a large, multi-mode optical waveguide to a smaller, single-mode optical waveguide, the tapered rib waveguide comprising two portions formed of the same material.

GB patent application N° 2,345,980 discloses a mode shape converter having upper and lower optical rib waveguides. The core and waveguides are made of a single medium. The tapering effect in the depth direction is obtained even though only a tapering in a width direction is made.

R. S. Fan et al, in Journal of Lightwave Technology, vol. 17, no. 3, March 1999, pp. 466-474, disclose a tapered polymer waveguide structure for coupling light between optical waveguides with differing geometries. The disclosed 3D taper structure has linear tapers and a linear index grading. There is near adiabatic propagation if the structure is built sufficiently long.

US patent application 2002/118,916 discloses a mode transformer that enables using an embedded dual taper to achieve low-loss coupling between two waveguides, one of them having a much higher index difference than the other. The mode transformer includes a first and a second dielectric channel waveguide, each including a core with a tapered region. A portion of the second tapered region is embedded within the first tapered region, and the embedded portion of the second tapered region is completely surrounded by the first tapered region in the cross-section transverse to the mode transformation direction.

R. Zengerle et al., in Journal of Vacuum Science and Technology B, vol. 9, no. 6, November/December 1991, pp. 3459-3463 describe a waveguide device for spot-size transformation of an optical beam from the 1 µm range to about 8 µm using a wedge-shaped taper based on InP. The structure has on one side a typical buried rib waveguide that is compatible with a laser waveguide. The transformation structure ends in a very thin but wide output waveguide which is butt connected to the core of the single-mode fiber.

A waveguide taper structure with a similar thin but wide output, waveguide for coupling to an optical fiber is shown by R. Zengerle et al. in Journal of Vacuum Science and Technology B, vol. 11, no. 6, November/December 1993, pp. 2641-2644. The simple two layer structure is suitable for very low-loss chip-fiber interconnections.

Applicant has remarked that the use in mode size converters of thin and wide output waveguides for coupling to optical fibers, although useful in many respects, may give rise to polarization sensitivity for the mode size converter.

Accordingly, Applicant has studied tapered optical mode converters that include an input/output coupling waveguide with a substantially square cross section. This type of coupling waveguides has, as a further advantage, a simple alignment with optical fibers. On the contrary, thin and wide coupling waveguides of the type shows, e.g., in the two papers by R. Zengerle et al. cited above, have a mode that, although substantially round in shape, shows a sharp peak in the direction orthogonal to the "thin" side of the coupling waveguide. This can make the alignment with the mode of an optical fiber critical.

Applicant has faced the problem of reducing the length of a tapered structure for a predetermined desired value of coupling efficiency, while ensuring a smooth, i.e. almost adiabatic coupling of the optical mode between the coupling waveguide and the receiving waveguide.

SUMMARY OF THE INVENTION

Applicant has found that a reduced length for a tapered structure of a mode converter can be achieved in a structure comprising two waveguides, at least one of which is tapered, arranged side by side so as to be optically coupled along a coupling region, if the refractive indexes of the cores of the two waveguides are selected so that the effective refractive index of the combined waveguide resulting from the coupling of the two waveguides has a small excursion over the length of the combined waveguide.

The invention relates to an optical mode converter having the features set forth in the claims that follow. The invention also relates to a method for fabricating an optical tapered waveguide, having the features set forth in the claims that follow.

A first aspect of present invention relates to an optical mode converter comprises a coupling waveguide and a receiving waveguide. The coupling waveguide has at an input end a first effective refractive index $n_{1eff}$ and includes a tapered core of a substantially constant refractive index $n_1$ with a substantially square cross section at the input end, having a size that tapers down moving away from the input end. The coupling waveguide has also a cladding at least partially surrounding the tapered core. The receiving waveguide has a second effective refractive index $n_{2eff}$ at an output end and comprises a core of a substantially constant refractive index $n_2$, greater than the refractive index $n_1$ of the tapered core of the coupling waveguide, and a cladding at least partially surrounding the core.

A side surface of the tapered core of the coupling waveguide is optically in contact, in a coupling portion, with the receiving waveguide so as to allow optical coupling between the coupling waveguide and the receiving waveguide.

The refractive index $n_1$ of the tapered core of the coupling waveguide is selected so that the first effective refractive index $n_{1eff}$ and the second effective refractive index $n_{2eff}$ differ from each other in absolute value less than 30% of the difference $(n_2-n_{eff})$ between the core refractive index and the effective refractive index of the receiving waveguide.

A further aspect of the present invention relates to a method for fabricating an optical tapered waveguide comprising:
  growing a bottom cladding layer on a substrate,
  digging a wedge shape with a predetermined depth (h) into the bottom cladding layer,
  filling the wedge shape with an optical transmissive material having a refractive index $n_1$, so as to form a wedge,
  growing a receiving core above the wedge in a way to optically contact at least partially the core layer with an upper surface of the wedge,
  growing a top cladding layer on the receiving core.

The refractive index $n_1$ of the wedge is selected so that a first effective refractive index $n_{1eff}$ of a receiving waveguide having the wedge as a core and a second effective refractive index $n_{2eff}$ of a waveguide having the receiving core as a core differ from each other in absolute value less than 30% of the difference $(n_2-n_{2eff})$ between the refractive index of said receiving core and the effective refractive index of the receiving waveguide.

BRIEF DESCRIPTION OF THE DRAWINGS

Further features and advantages of the present invention will appear more clearly from the following detailed description of preferred embodiments, made with reference to the attached drawings. In such drawings there are shown:

in FIG. 5b an enlargement along the y axis of the central portion of the graph of FIG. 5a;

in FIG. 6b an enlargement along the y axis of the uppermost portion of the graph of FIG. 6a;

in FIGS. 13a and 13b a front view of an input end and of an output end, respectively, of another example of a mode converter according to the present invention;

in FIGS. 14a and 14b a front view of an input end and of an output end, respectively, of another example of a mode converter according to the present invention;

in FIGS. 15a and 15b a front view of an input end and of an output end, respectively, of another example of a mode converter according to the present invention;

in FIGS. 16a and 16b a front view of an input end and of an output end, respectively, of another example of a mode converter according to the present invention;

DETAILED DESCRIPTION OF THE INVENTION

Figure 1:
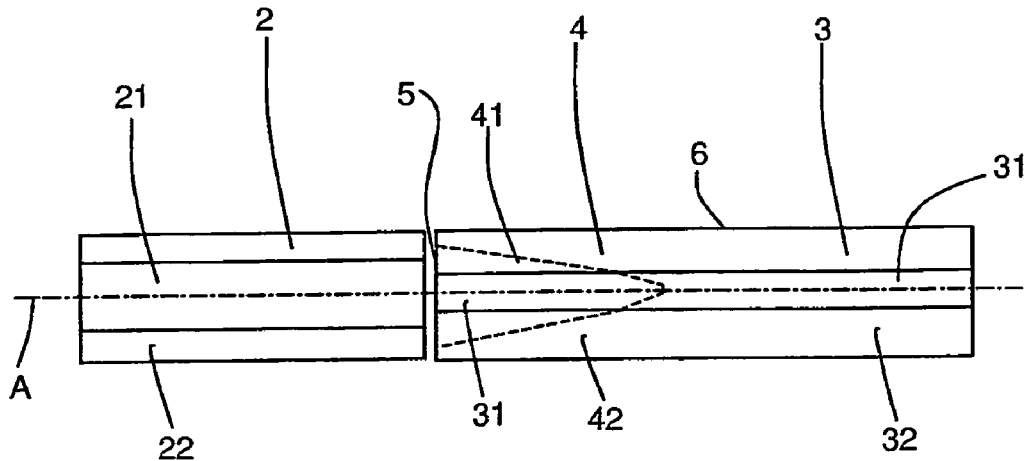
in FIG. 1 a schematic top view of a device according to the present invention including a launching waveguide and a mode converter with a receiving waveguide.

In FIG. 1 a launching optical waveguide 2 is shown having respective core 21 and cladding 22. Launching optical waveguide 2 is coupled to an optical mode converter 6, including a receiving optical waveguide 3 with respective core 31 and cladding 32, and a coupling optical waveguide 4 with tapered core 41 and cladding 42. Coupling waveguide 4 is at least partly superposed, or otherwise in optical contact, with receiving waveguide 3. Launching optical waveguide 2 is optically coupled to an input end 5 of coupling waveguide 4. Launching waveguide 2 has a core refractive index $n_{1a,co}$, a cladding refractive index $n_{1a,cl}$ and an effective refractive index $n_{1a,eff}$ at an operating wavelength. The effective refractive index of a waveguide is associated to the propagation speed of the fundamental mode in the waveguide at the operating wavelength. It depends on the absolute refractive index of said waveguide, on the refractive index difference between the core and the cladding of the waveguide and on the dimensions and shape of the waveguide. The operating wavelength is within a wavelength band of interest, for example between about 1290 and 1650 nm. These are typical wavelength bands of interest for channels of a multi-wavelength signal of optical networks.

Coupling optical waveguide 4 has, at the operating wavelength, a core refractive index $n_1$ and a cladding refractive index $n_{1,cl}$. Due to the tapered shape of the core, the effective refractive index of coupling optical waveguide varies along its length. The input effective refractive index of coupling waveguide 4, i.e., the effective refractive index at the input end 5 thereof, will be indicated as $n_{1eff}$. Receiving waveguide 3 has a core refractive index $n_2$ and a cladding refractive index $n_{re,cl}$. The optical mode propagating in the mode converter is distributed between the cores of the coupling and of the receiving waveguide, so that the effective refractive index will vary along the device. We shall indicate with $n_{2eff}$ the effective refractive index at the operating wavelength of receiving waveguide 3 in its portion that is not in contact with the coupling waveguide, e.g. at its output end, i.e. close to the mode converter end opposite to input end 5 of coupling waveguide 4. In all the above waveguides the cladding refractive index is lower than the respective core refractive index. The cladding refractive indexes of the coupling waveguide 4 and of the receiving waveguide 3 may be, but are not necessarily, equal to each other. Examples of materials that can be used for the mode converter of the invention are silica ($SiO_2$), germanium doped silica, silica nitride ($SiO_xN_y$) or silicon nitride ($Si_3N_4$), on a silicon substrate, or a semiconductor material, such as InGaAsP/InP or AlGaAs/GaAs. Generally, a launching waveguide is a waveguide from which an optical beam is output, and a receiving waveguide is a waveguide in which an optical beam is input, although the mode converter can also work, equivalently, with the opposite beam propagation direction, i.e., from the receiving waveguide to the launching waveguide. The actual beam propagation direction will depend on the function of the optical components or devices that are coupled by the mode converter and may also vary during operation. The mode converter may even operate on two oppositely propagating beam at a same time, if required by the operation of the components or devices. The mode converter is adapted to couple a launching waveguide, that can be itself part of an optical device (e.g. a pigtail fiber), to an optical device having an input and/or output waveguide with different characteristics from the launching waveguide, such as a different mode size, a different mode shape, or both. Typically, the launching waveguide is an optical fiber, preferably a single mode optical fiber.

The mode converter of the invention can be integrated into an optical device, for example an active planar device such as a laser, an optical amplifier, a light modulator, a light switch, or a passive planar device, such as a beam splitter, a beam combiner, a multiplexer, a filter or the like, or a integrated chip including both passive and active devices (system on chip). As an alternative, the mode converter can be made as a separate optical component and coupled between a launching waveguide and an optical device. In the latter case, the mode profile of the receiving waveguide of the mode converter should match as close as possible the mode profile of the optical device, to ensure a proper optical coupling between them.

The mode converter of the invention can be made by the techniques of integrated planar optics, as will be described in the following. A plurality of mode converters can be implemented on a single substrate by a single series of processing steps, resulting in an integrated component that can provide mode conversion between a plurality of launching waveguides, for example a plurality of pigtail fibers, and a plurality of receiving waveguides, for example the receiving waveguides of a multichannel component (filter, multiplexer, demultiplexer and the like) that can be used in WDM (wavelength division multiplexing, i.e., multi-wavelength) optics.

Figure 2A:
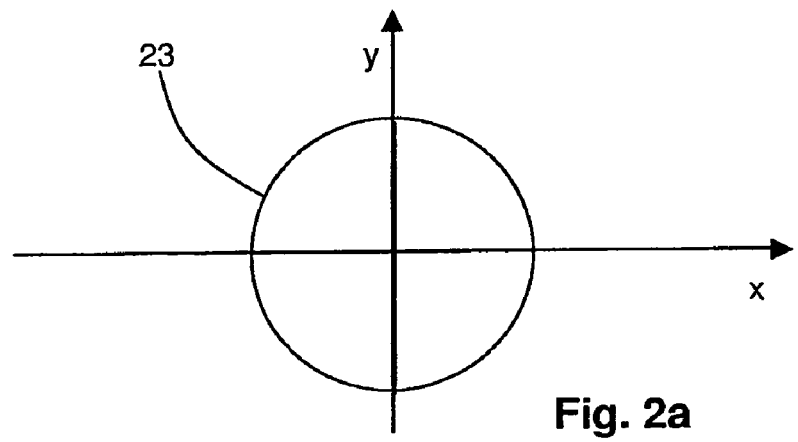
in FIG. 2a a mode profile exiting from a launching waveguide.

As shown in FIG. 2a, the launching waveguide 2 has a launching mode profile 23 which depends on the dimensions (core and cladding) of the waveguide, on the refractive index difference between the core and the cladding of said waveguide and on the absolute refractive indexes of core and cladding, and is defined as the contour of the area wherein the intensity of the optical beam is greater than $I/e^2$ where I is the peak intensity. This launching mode profile has, for example, a substantially circular shape. Single mode optical fibers have a circular mode field, with an aspect ratio of 1:1 and a mode size that is typically of about 7 to 10 μm.

Figure 2B:
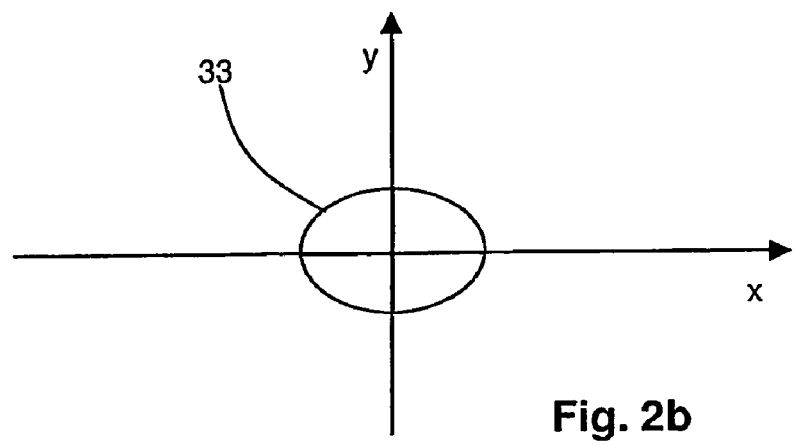
in FIG. 2b a mode profile entering to a receiving waveguide.

Analogously, receiving waveguide 3, having different characteristics with respect to the launching waveguide 2, has a receiving mode profile 33, for example with a substantially elliptical shape as shown in FIG. 2b, and with different dimensions with respect to the launching mode profile of launching waveguide.

To couple an optical beam from launching waveguide 2 to receiving waveguide 3 substantially without power losses, the launching mode profile 23 is changed in shape and/or in dimensions by the mode converter in a way to become substantially of the same shape and size of the receiving mode profile 33 of receiving waveguide 3.

Optical coupling waveguide 4 assists in the conversion between the launching mode profile and the receiving mode profile.

The launching mode profile 23 is changed at least along one of the two axes, e.g. the vertical axis y. Typically, the launching mode profile 23 is changed both along the horizontal axis x and the vertical axis y.

Figure 3A:
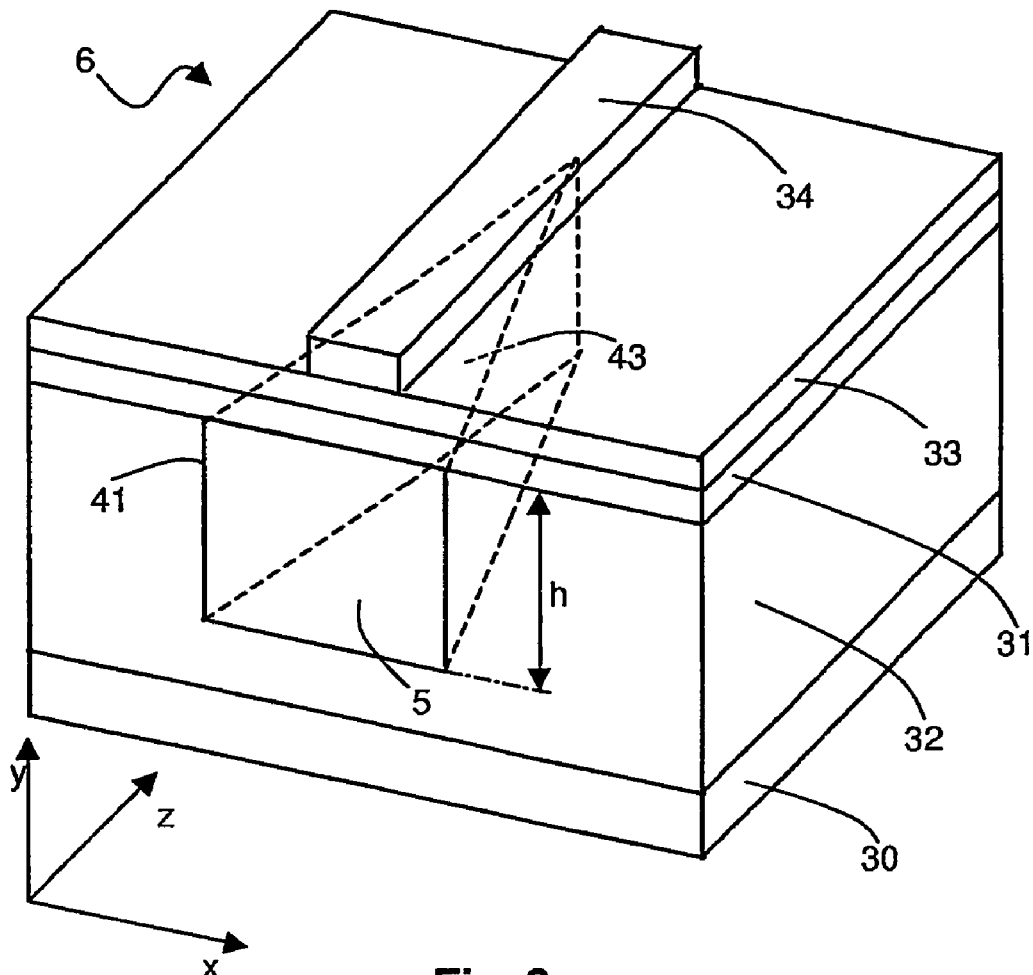
in FIGS. 3a and 3b a three-dimensional view and a side view, respectively, of a mode converter according to the present invention having a ridge receiving waveguide.
Figure 3B:
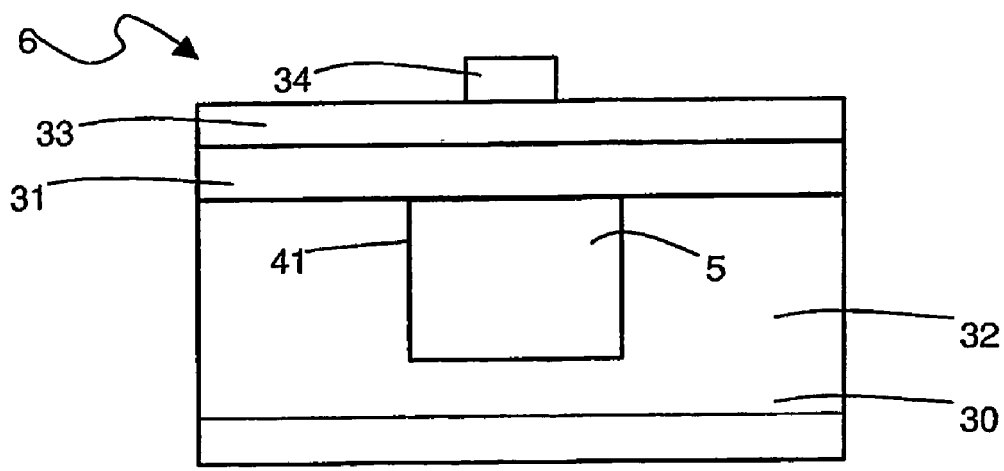

An example of a mode converter 6 according to the present invention is shown in FIGS. 3a and 3b. The device comprises a receiving waveguide integrated with a coupling waveguide on a common substrate 30.

The substrate 30 is for example made of silicon. In this example the receiving waveguide comprises a plurality of superposed layers.

Layer 32 is a first cladding layer, for example made of silica (silicon dioxide). On top of said first layer 32 a core layer 31 is arranged. For example, the core layer is made of silica nitride. On top of the core layer 31 a second cladding layer 33 is arranged. For example, said second cladding layer is made of silica.

The first cladding layer and the second cladding layer are respectively a bottom cladding and a top cladding of the receiving waveguide. In the example both cladding layers have a same refractive index of $n_{2,cl}$, and the core layer 31 has a refractive index $n_2$. The receiving waveguide has an effective refractive index $n_{2eff}$ in its portion that is not in contact with the coupling waveguide, e.g. at its output, i.e. close to the mode converter end opposite to input end 5 of the coupling waveguide.

A tapered coupling waveguide is arranged so as to be in contact with the core layer of the receiving waveguide, so as to provide optical coupling between the coupling waveguide and the receiving waveguide. The core 41 of the coupling waveguide has substantially a wedge shape and is arranged under the core layer 31 of the receiving waveguide with its top triangular surface 43 in contact with the lower surface of the core layer 31 for all its length.

In particular, said wedge has a substantially triangular base in a plane identified by axes x and z of FIG. 3a, an input end 5 and two vertical sides that are generally straight but may be, as an alternative, curved, e.g., with a shape of a hyperbole, or an exponential shape, or a segmented shape. Preferably the wedge has substantially a same height h, along the vertical axis y, for all the wedge length.

The input end 5 of the coupling waveguide core 41 has typically a substantially square shape, i.e., a rectangular shape with an aspect ratio between about 0.5 and 2. Preferably, the cross section of the coupling waveguide core at its input end has an aspect ratio of between about 0.8 and 1.25. Even more preferably, the cross section of the coupling waveguide core at its input end is square shaped.

The tip of the wedge, i.e., the end of the wedge opposite to input end 5, is shown as a line in the schematic drawing. However, the tip of the wedge will have in practice a finite size, due to technological constraints. In practice, the effective refractive index of the wedge and surrounding cladding, in the wedge tip region, should be much closer to the surrounding cladding refractive index than to the wedge refractive index.

On the surface of the second cladding layer 33 a ridge 34 is provided. The shape of the ridge determines the lateral confinement and the propagation direction of the optical beam which travels in the receiving waveguide.

In the example of FIGS. 3a and 3b, a ridge receiving waveguide is provided. A different kind of waveguide may be provided, for example a buried waveguide in which a guiding element is buried into a cladding layer, for example of silica. Said guiding element works like a ridge and it determines the lateral confinement and the propagation direction of the optical beam, which travels along the waveguide.

Another used waveguide is an ARROW waveguide (Anti-Resonant Reflecting Optical Waveguide) or a photonic crystal in which a plurality of holes are provided on an optical substrate. The position of the holes determines a waveguide on the optical substrate. Examples of other types of waveguide will be described in the following.

In general, the triangular top surface 43 of the coupling waveguide need not be in contact with the receiving waveguide. It is enough that the coupling waveguide and the receiving waveguide are optically in contact along a respective portion. For the purpose of present invention "optically in contact" means that the coupling waveguide (e.g., at least a portion of the triangular top surface of its tapered core) and at least a portion of the receiving waveguide are relatively positioned in a way to have a superposition of the input mode profile with the receiving mode profile. In particular, "superposition" means that if I is the maximum intensity of the optical beam of the input mode profile, the overlap integral in a plane defined with respect to said x and y axes of the two mode profile has an intensity which is more than $I/e^2$. In practice, a layer can be interposed between the two cores of the coupling and receiving waveguide. Preferably such layer has a refractive index lower than the refractive index $n_2$ of the core of the receiving waveguide, for example such layer can have a refractive index equal to that of other cladding layers 32 or 33 of the mode converter.

The mode profile guided into the coupling waveguide in the vertical direction depends on the refractive index $n_1$ of the core of the coupling waveguide, on the refractive index $n_2$ of the core of the receiving waveguide, on the refractive index of the respective claddings and on the shape of the triangular surface 43, but not on the vertical shape of the coupling waveguide core as long as the vertical height of the coupling waveguide core is substantially constant along the propagation direction. The input mode profile of the coupling waveguide depends on its refractive index and on the shape of its input surface 5. Said input surface 5 is preferably a vertical surface having dimension substantially similar to the launching mode profile of the launching waveguide in a way to obtain a substantial matching between said launching mode profile of the launching waveguide and the input mode profile of the coupling waveguide. In particular, the input surface of the core of the coupling waveguide has preferably a square cross section with a side of between 6 and 10 μm, to match the mode profile of typical optical fibers.

For the purpose of present invention "to obtain a substantial matching" means substantially to obtain a value of an overlap integral between said launching mode profile of the launching waveguide and the input mode profile of the coupling waveguide between about 0.8 and 1. In said interval, the coupling loss is less than about 1 dB.

The top triangular surface 43 of wedge 41 (tapered core of the coupling waveguide) substantially determines a change of the horizontal dimension (along the x axis in FIG. 3a) of the launching mode profile propagating along z axis from the launching waveguide to the receiving waveguide.

To convert the launching mode profile in the vertical direction (along the y axis in FIG. 3a) the tapered core 41 of the coupling waveguide of the present invention is made of a material which is optically transmissive in the wavelength band of interest and has a refractive index $n_1$ lower than the core refractive index $n_2$ of the receiving waveguide. The refractive index $n_1$ is higher than the cladding refractive index $n_{2,cl}$ of the receiving waveguide ($n_{2,cl} < n_1 < n_2$).

Adequate materials for the tapered core 41 of the coupling waveguide are for example silica nitride or germanium doped silica, whose refractive index can be determined by selecting an appropriate composition.

In this way, the guidance capacity of the core of the coupling waveguide becomes less than the guidance capacity of core of the receiving waveguide. The core 31 of the receiving waveguide 3 substantially attracts the mode guided in the coupling waveguide core during the propagation (z axis in figures) of the optical beam, which has in this way a "center of gravity" of the guided mode into the coupling waveguide which becomes closer to the receiving waveguide. This is due to the effect of the core refractive index $n_2$ of the receiving waveguide which is higher than the core refractive index $n_1$ of the coupling waveguide and to the effect of the wedge shape of the core of the coupling waveguide.

According to the present invention the refractive index $n_1$ of the tapered core of the coupling waveguide is selected so that the effective refractive index $n_{1eff}$ of the coupling waveguide at its input differs in absolute value from the effective refractive index $n_{2eff}$ of the receiving waveguide at its output by less than 30%, preferably by less than 20%, and more preferably by less than 10%, of the difference $(n_2-n_{2eff})$ between the core refractive index and the effective refractive index of the receiving waveguide.

Applicant has determined that the above selection criterion for the refractive index $n_1$ of the tapered core substantially corresponds to selecting the effective refractive index $n_{1eff}$ of the coupling waveguide at its input and the effective refractive index $n_{2eff}$ of the receiving waveguide at its output so that they differ from each other in absolute value less than the minimum excursion $\Delta_{mM}$ along the length of the mode converter of the effective refractive index for the fundamental mode propagating through the converter in the combined waveguide resulting from the combination of the coupling waveguide and the receiving waveguide. The excursion $\Delta_{mM}$ of the effective refractive index along the length of the mode converter assumes a minimum value when the input effective refractive index $n_{1eff}$ approximately equals the output effective refractive index $n_{2eff}$ of the combined waveguide.

In particular, Applicant has remarked that a small excursion of the effective refractive index along the combined waveguide of the mode converter corresponds to a low reflection loss for the mode converter and hence to an increase in coupling efficiency. A possible mechanism for the reduction in reflection loss is the following: each small variation in effective refractive index corresponds to a small refractive index step for the propagating mode and, hence, to a small reflection. A low overall variation in effective refractive index allows a quasi adiabatic propagation of the mode and reduces overall reflections in the mode converter and hence loss.

Applicant has observed that the above selection criterion for the refractive index $n_1$ of the tapered core allows to significantly reduce the length of the tapered core for a predetermined desired value of coupling efficiency, while ensuring a smooth, i.e. almost adiabatic coupling of the optical mode between the coupling waveguide and the receiving waveguide. It is remarked that the size of integrated optics devices is often very small in comparison to the size of typical mode converters. The length of the mode converter is dictated by the length of its tapered section, so a reduction in length of the tapered coupling waveguide entails a significant reduction of the mode converter size and of overall length of the optical device including the mode converter.

A launching waveguide 2 can be disposed close to the input end 5 of the coupling waveguide, preferably in contact with said input surface, so that the coupling waveguide captures the optical beam from the launching waveguide 2. Preferably, the coupling waveguide is coaxially disposed with respect to a launching waveguide longitudinal axis A, so as to maximize the optical beam power transferred from the launching waveguide to the coupling waveguide.

A possible selection criteria for the refractive index of the coupling waveguide would be to maximize the overlap integral of the mode profiles of the launching waveguide and the coupling waveguide. However, Applicant has remarked that in practice, if the input end of the coupling waveguide core is substantially square shaped, the "face" coupling between the above two modes is far less critical than the "side" coupling between the tapered coupling waveguide and the receiving waveguide. Accordingly, the refractive index $n_1$ of the tapered core of the coupling waveguide is advantageously selected, according to the invention, so as to achieve a good coupling between the coupling waveguide and the receiving waveguide. Applicant has observed that, in practice, a good coupling can be achieved with this value of $n_1$ even as to the coupling between the launching waveguide and the coupling waveguide, by appropriately selecting the size of the input end of the coupling waveguide.

The Applicant has determined that the invention device has a small wavelength sensitivity. This is at least partly due to the fact that the operation of the device does not depend on resonant phenomena A mode converter according to the invention can be designed to operate over the band 1420-1620 nm, or even over the band 1290-1650 nm.

EXAMPLE 1

Figure 4A:
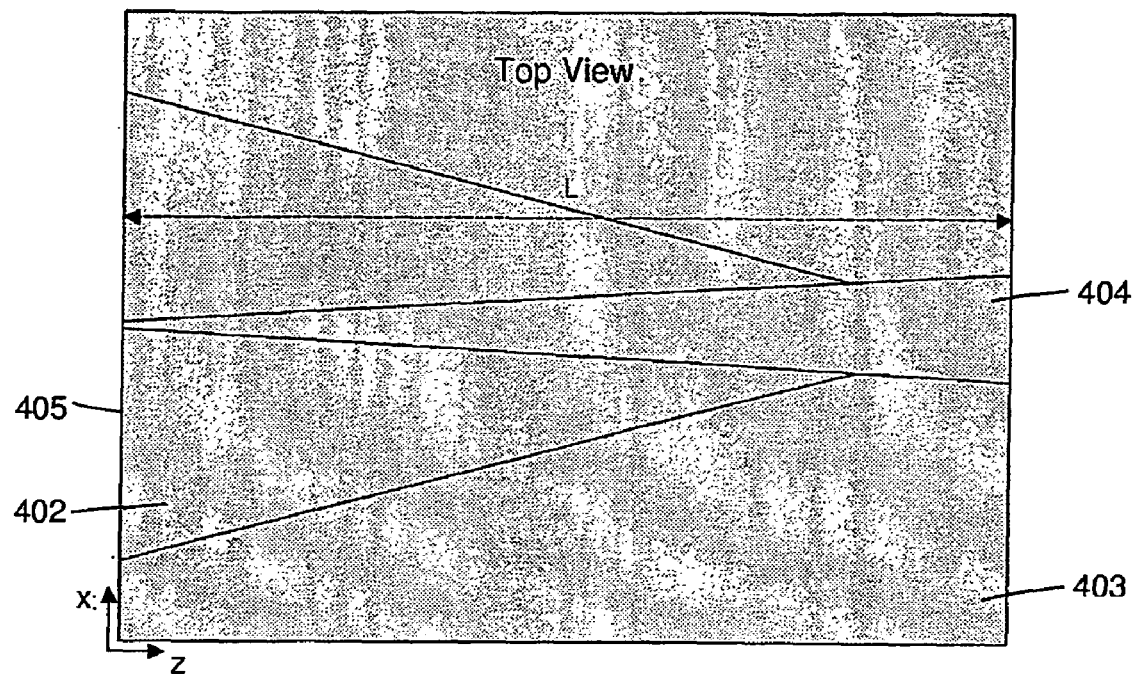
in FIGS. 4a and 4b a top view and side view, respectively, of a first example of a mode converter according to the present invention.
Figure 4B:
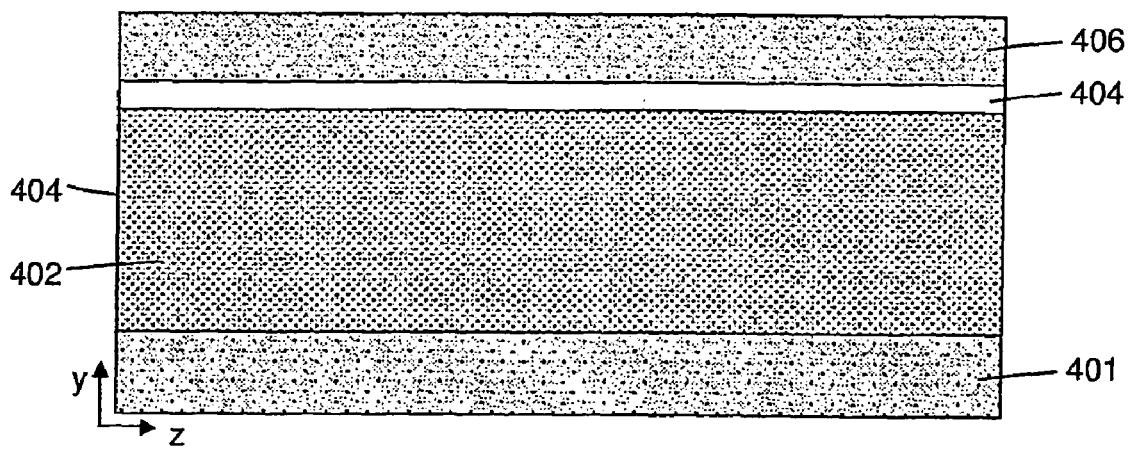

In an example, a mode converter has a shape as shown in FIG. 4a (top view) and 4b (side view). In the example, both the coupling waveguide and the receiving waveguide are tapered along the length L of the device, with opposite taper directions. A bottom cladding layer 401 with a refractive index $n_{cl}=1.444$ is arranged over a substrate (not shown). The coupling waveguide 402 has a core of refractive index $n_1$ with a square cross section (height of 8 μm and width of 8 μm) at its input end 405. The coupling waveguide tapers its width to about 0 over the length L of the mode converter and has a constant height over its length. On the sides of the coupling waveguide the layer of the same height is filled with a cladding material 403 having the same refractive index $n_{cl}=1.444$ of the bottom cladding layer. The receiving waveguide, arranged directly above the coupling waveguide and with its main axis aligned to the main axis z of the coupling waveguide, has a core 404 with a linearly tapered width that starts from 0 at the input end 405 of the coupling waveguide and reaches a value of 2 μm at its opposite (output) end. The receiving waveguide core 404 has a constant height of 2 μm throughout its length, so that the output end of the receiving waveguide core has a square cross section of 2 μm×2 μm. The refractive index of the receiving waveguide core is $n_2=1.520$. The effective refractive index of the receiving waveguide near its output for the fundamental TM mode is $n_{2eff}=1.4795$. On the sides of the receiving waveguide the layer of the same height is filled with a cladding material having the same refractive index $n_{cl}=1.444$ of the bottom cladding layer. A top cladding layer 406, again with a refractive index of $n_{cl}=1.444$, is arranged above the layer including the receiving waveguide.

Figure 5A:
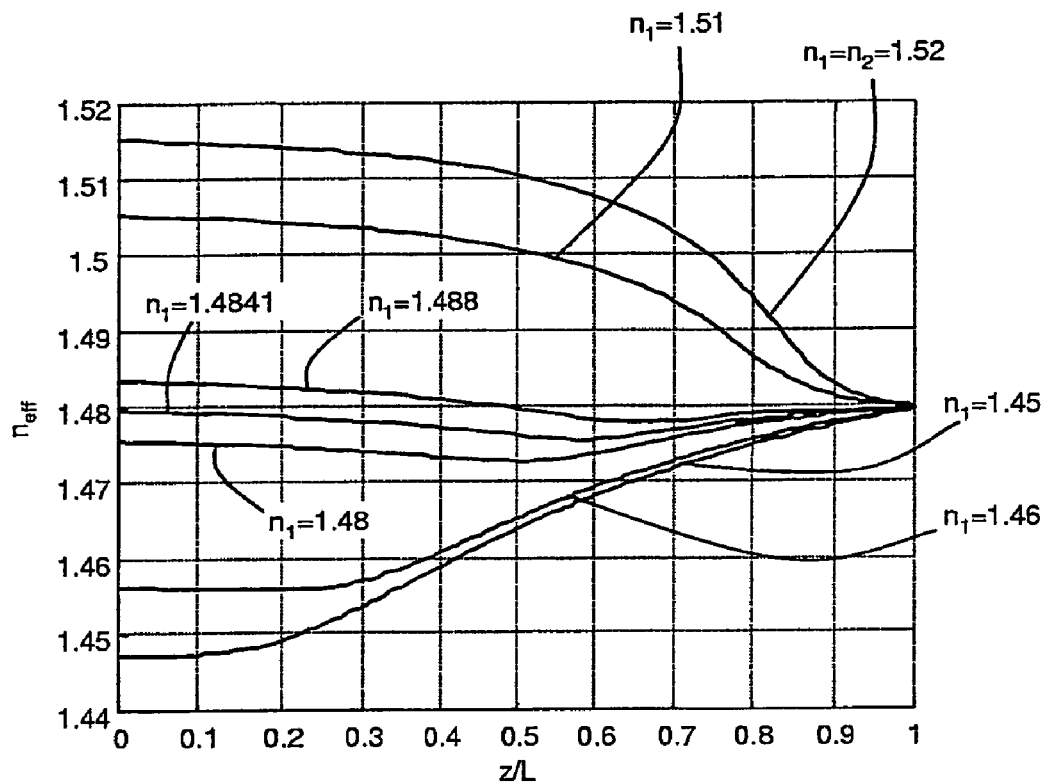
in FIG. 5a a graph with the evolution of the effective refractive index for the TM mode along the length of the mode converter of FIG. 4a, 4b.
Figure 5B:
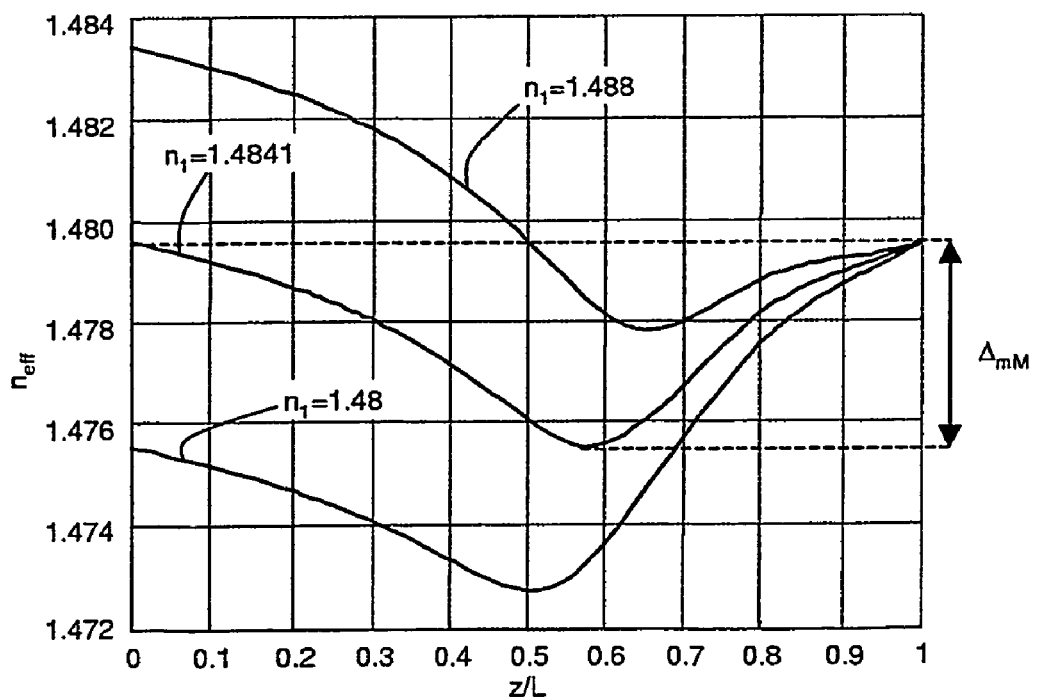

In a series of simulations, Applicant has varied the refractive index $n_1$ of the tapered core of the coupling waveguide to discrete values in a range between 1.450 (slightly above the cladding refractive index) and 1.520 (the refractive index $n_2$ of the core of the receiving waveguide). FIG. 5a shows the evolution along the length of the mode converter of the effective refractive index $n_{eff}$ for the fundamental TM mode at a wavelength of 1550 nm that propagates through the combined waveguide resulting from the superposition of the coupling waveguide and the receiving waveguide, for the various tested values of $n_1$. FIG. 5b shows an enlargement along the y axis of the central portion of FIG. 5a, corresponding to the three refractive index values of $n_1=1.488$, $n_1=1.4841$ and $n_1=1.480$. It can be observed that for $n_1=n_{1,2}=1.4841$, the effective refractive index $n_{eff}$ for the propagating fundamental TM mode at the input of the combined waveguide (i.e., at the input of the coupling waveguide) has a value $n_{1eff}=1.4795$ that is substantially equal to the value of the effective refractive index $n_{2eff}$ for the propagating fundamental mode at the output of the combined waveguide (i.e., at the output of the receiving waveguide). From FIG. 5b it can be seen that, for $n_1=n_{1,2}=1.4841$, the excursion of the effective refractive index $n_{eff}$ for the fundamental TM mode propagating along the combined waveguide is of about $\Delta_{mM}=0.004$. This substantially corresponds to the minimum excursion of $n_{eff}$ along the combined waveguide with respect to any value of $n_1$ and the corresponding value of $n_1=n_{1,2}$ represents an optimum value for coupling between the coupling waveguide and the receiving waveguide.

For comparison, the difference $(n_2-n_{2eff})$ between the core and the effective refractive index of the receiving waveguide is, in the case of the example, of about 0.041, so that $\Delta_{mM}$ corresponds in this case approximately to 10% of $(n_2-n_{2eff})$.

Figure 6A:
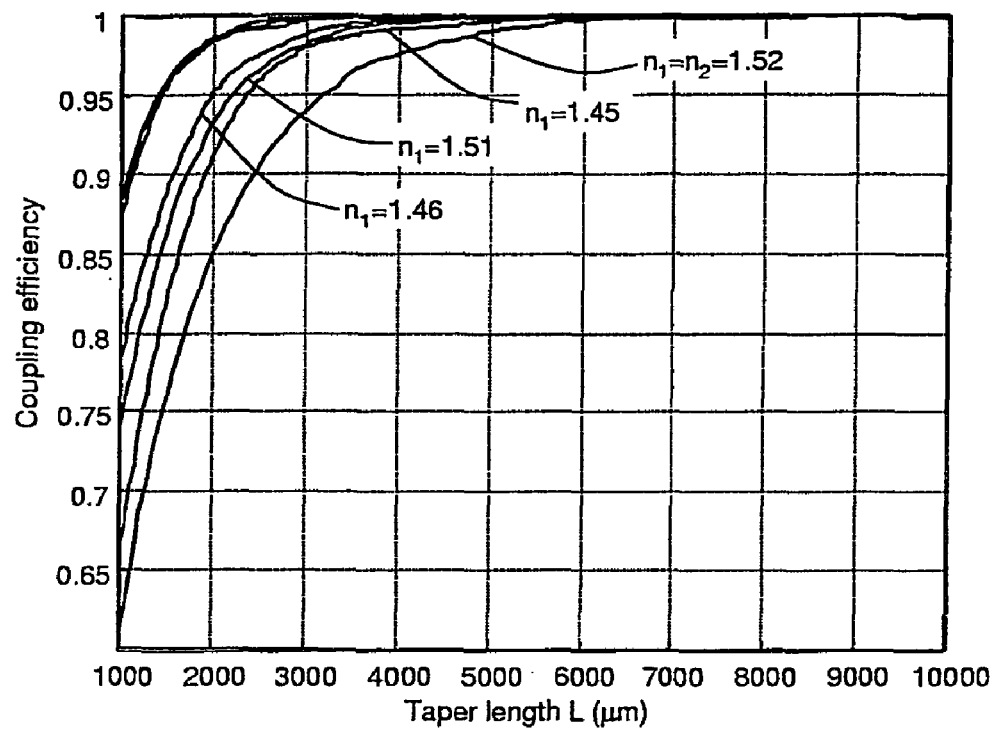
in FIG. 6a a graph with the coupling efficiency between a coupling waveguide and a receiving waveguide as a function of the length L of the tapered waveguide of the mode converter of FIG. 4a, 4b.
Figure 6B:
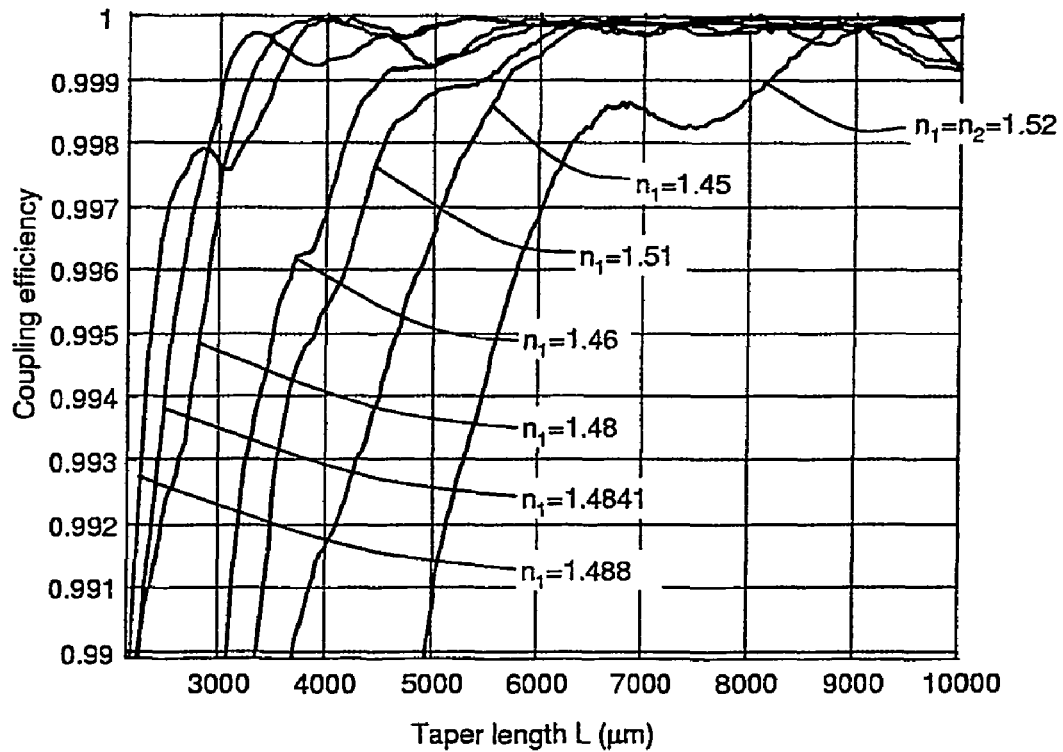

The upper and the lower curves shown in FIG. 5b correspond to excursions of $n_{eff}$ along the mode converter length of about 0.006 and respectively 0.007. Both values are within a range of about $2\Delta_{mM}$. The effective refractive index $n_{1eff}$ at the input end of the coupling waveguide is respectively of about $n_{2eff}+\Delta_{mM}$ (upper curve) and $n_{2eff}-\Delta_{mM}$ (lower curve). FIG. 6a plots the coupling efficiency between the coupling waveguide and the receiving waveguide as a function of the length L of the tapered waveguides. FIG. 6b shows an enlargement of the main graph, corresponding to the upper range of coupling efficiency values.

It can be clearly seen from FIGS. 6a and 6b that the three lines corresponding to $n_{1eff}$ within the optimum range $n_{2eff}\pm\Delta_{mM}$ correspond to a higher coupling efficiency than any other value of $n_1$. Moreover, values of $n_{1eff}$ within the range $n_{2eff}\pm\Delta_{mM}$ correspond to a coupling efficiency greater than 0.95 (corresponding to a coupling loss of less than 0.2 dB) for a length L of the mode converter of between about 1 and 2 mm. For values of $n_1$ outside the above optimum range, similar values of coupling efficiency require a much greater length L of the mode converter.

EXAMPLE 2

In another example, a mode converter has a same general shape as the one of example 2 and shown in FIG. 4a (top view) and 4b (side view), but some of the parameters differ from those of the previous example. Also in this example, both the coupling waveguide and the receiving waveguide are tapered along the length L of the device, with opposite taper directions. A bottom cladding layer with a refractive index $n_{cl}=1.444$ is arranged over a substrate (not shown). The coupling waveguide has a core of refractive index $n_1$ with a square cross section (height of 8 μm and width of 8 μM) at the input end. The coupling waveguide tapers its width to about 0 over the length L of the mode converter and has a constant height over its length. On the sides of the coupling waveguide the layer of the same height is filled with a cladding material having the same refractive index $n_{cl}=1.444$ of the bottom cladding layer. The receiving waveguide, arranged directly above the coupling waveguide and with its main axis aligned to the main axis of the coupling waveguide, has a core with a linearly tapered width that starts from 0 at the input end of the coupling waveguide and reaches a value of 1 μm at its opposite (output) end. The receiving waveguide core has a constant height of 300 nm throughout its length, so that the output end of the receiving waveguide core has a rectangular cross section of 1 μm (width)×300 nm (height). The refractive index of the receiving waveguide core is $n_2=2.200$. The effective refractive index of the receiving waveguide for the fundamental TM mode is $n_{2eff}=1.5819$. On the sides of the receiving waveguide the layer of the same height is filled with a cladding material having the same refractive index $n_{cl}=1.444$, of the bottom cladding layer. A top cladding layer, again with a refractive index of $n_{cl}=1.444$, is arranged above the layer including the receiving waveguide.

Figure 7:
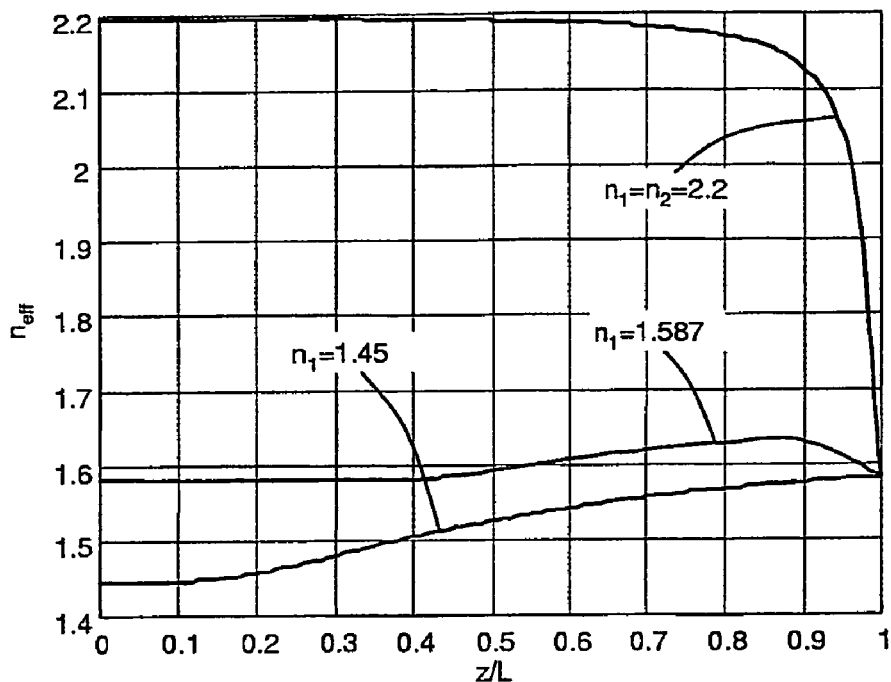
in FIG. 7 a graph with the evolution of the effective refractive index for the TM mode along the length of a mode converter according to a further example of the present invention.

In a series of simulations, Applicant has varied the refractive index $n_1$ of the tapered core of the coupling waveguide to the three discrete values of $n_1=1.450$ (slightly above the cladding refractive index) $n_1=n_{1,2}=1.587$ and $n_1=2.200$ (the refractive index $n_2$ of the core of the receiving waveguide). FIG. 7 shows the evolution along the length of the mode converter of the effective refractive index $n_{eff}$ for the fundamental TM mode at a wavelength of 1550 nm that propagates through the combined waveguide resulting from the superposition of the coupling waveguide and the receiving waveguide, for the three tested values of $n_1$. It can be observed that for $n_1=n_{1,2}=1.587$, the effective refractive index $n_{eff}$ for the propagating fundamental TM mode at the input of the combined waveguide (i.e., at the input of the coupling waveguide) assumes a value of about $n_{1eff}=1.582$ that is substantially equal to the value of the effective refractive index $n_{2eff}$ for the propagating fundamental mode at the output of the combined waveguide (i.e., at the output of the receiving waveguide). From FIG. 7 it can be seen that, for $n_1=n_{1,2}=1.587$, the maximum excursion of the effective refractive index $n_{eff}$ for the fundamental mode propagating along the combined waveguide is of about $\Delta_{mM}=0.050$. For comparison, the difference $(n_2-n_{2eff})$ between the core and the effective refractive index of the receiving waveguide is, in the case of this example, of about 0.62, so that ΔmM corresponds to slightly less than 10% of $(n_2-n_{2eff})$.

The lower curve shown in FIG. 7 corresponds to a value of $n_{1eff}$ that differs of about 0.14 from the optimum value of $n_{2eff}$, i.e., about 20% of $(n_2-n_{2eff})$.

Figure 8:
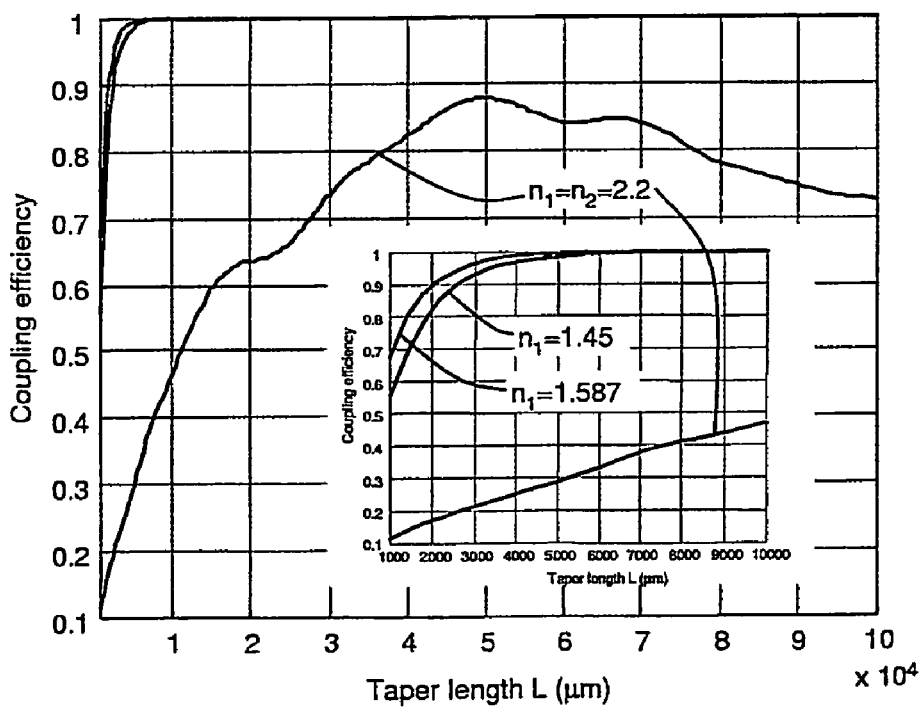
in FIG. 8 a graph with the coupling efficiency between a coupling waveguide and a receiving waveguide as a function of the length L of the tapered waveguide of the mode converter of FIG. 7.

FIG. 8 plots the coupling efficiency between the coupling waveguide and the receiving waveguide as a function of the length L of the tapered waveguides. The inset in FIG. 8 shows an enlargement of the main graph, corresponding to the lower range (1000 to 10000 μm) of the taper length L values.

It can be seen from FIG. 8 that the two uppermost curves, corresponding to $n_1=1.45$ and $n_1=n_{1,2}=1.587$, and hence to a value of $n_{1eff}$ within a range $n_{2eff}\pm 2\Delta_{mM}$, correspond to a much higher coupling efficiency than the lower curve, corresponding to a value of $n_{1eff}$ outside the above range. Moreover, values of $n_{1eff}$ within a range $n_{2eff}\pm 2\Delta_{mM}$ correspond to a coupling efficiency greater than 0.95 (corresponding to a coupling loss of less than 0.2 dB) for a length L of the mode converter of about 3.5 mm or greater. For the remaining value of $n_1$, outside the above optimum range, a maximum coupling efficiency of about 0.88 can be achieved only for a device length of about 50 mm.

EXAMPLE 3

Figure 9A:
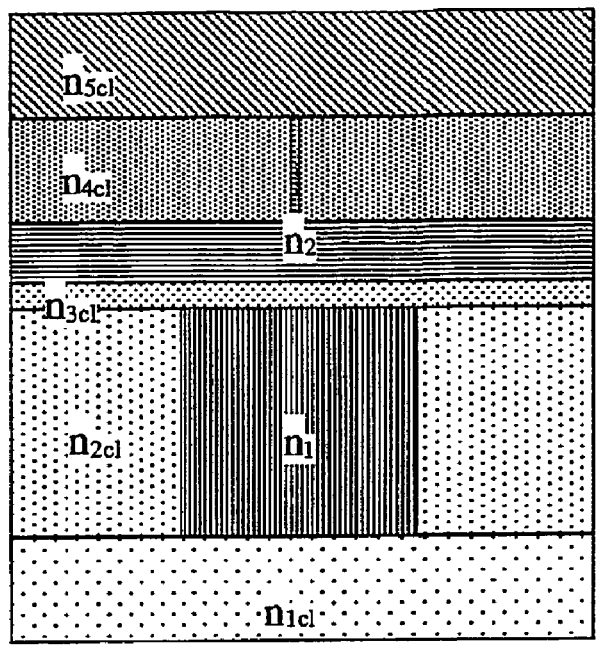
in FIGS. 9a and 9b a top view and side view, respectively, of another example of a mode converter according to the present invention.
Figure 9B:
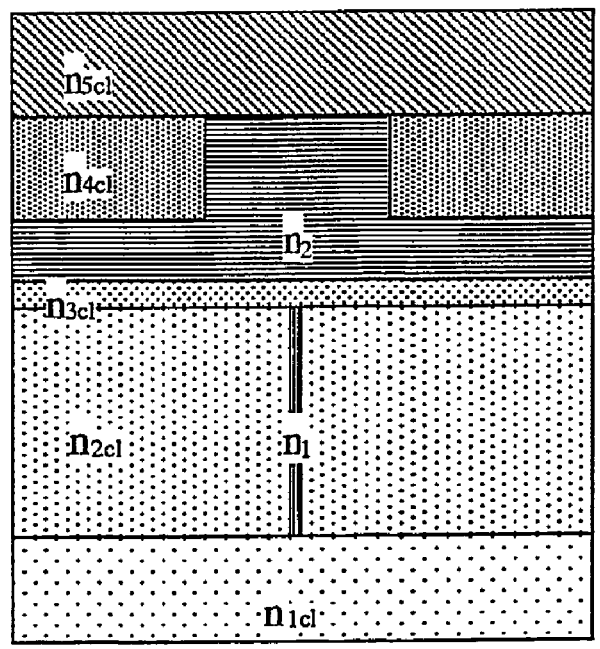

In another example, a mode converter has the shape shown in FIGS. 9a and 9b, that respectively show a front view of the input surface (z=0) and of the output, surface (z=L) of the mode converter. Also in this example, both the coupling waveguide and the receiving waveguide are tapered along the length L of the device, with opposite taper directions. A bottom cladding layer with a refractive index $n_{1cl}=1.444$ is arranged over a substrate (not shown). The coupling waveguide has a core of refractive index $n_1$ with a square cross section (height of 8 μm and width of 8 μm) at the input end. The coupling waveguide tapers its width to about 0 over the length L of the mode converter and has a constant height over its length. On the sides of the coupling waveguide the layer of the same height is filled with a cladding material having a refractive index $n_{2cl}=1.446$. A thin intermediate layer with a thickness of 100 nm and a refractive index $n_{3cl}=1.447$ is arranged over the layer including the coupling waveguide. A receiving waveguide, arranged over the intermediate layer and with its main axis aligned to the main axis of the coupling waveguide, has a core including a first non structured layer with a thickness of 1 μm, surmounted by a 2 μm thick rib with a linearly tapered width that starts from about 0 at the input end of the coupling waveguide and reaches a value of 3 μm at its opposite (output) end. The output end of the receiving waveguide core has a cross section including a 1 μm base surmounted by a 3 μm (width)×2 μm (height) rectangle. The refractive index of the receiving waveguide core is $n_2=1.540$. The effective refractive index of the receiving waveguide for the fundamental TM mode is $n_{2eff}=1.5236$. On the sides of the rib belonging to the core of the receiving waveguide the layer of the same height is filled with a cladding material having a refractive index $n_{4cl}=1.445$. A top cladding layer, with a refractive index of $n_{5cl}=1.448$, is arranged above the layer including the rib of the core of the receiving waveguide.

Figure 10:
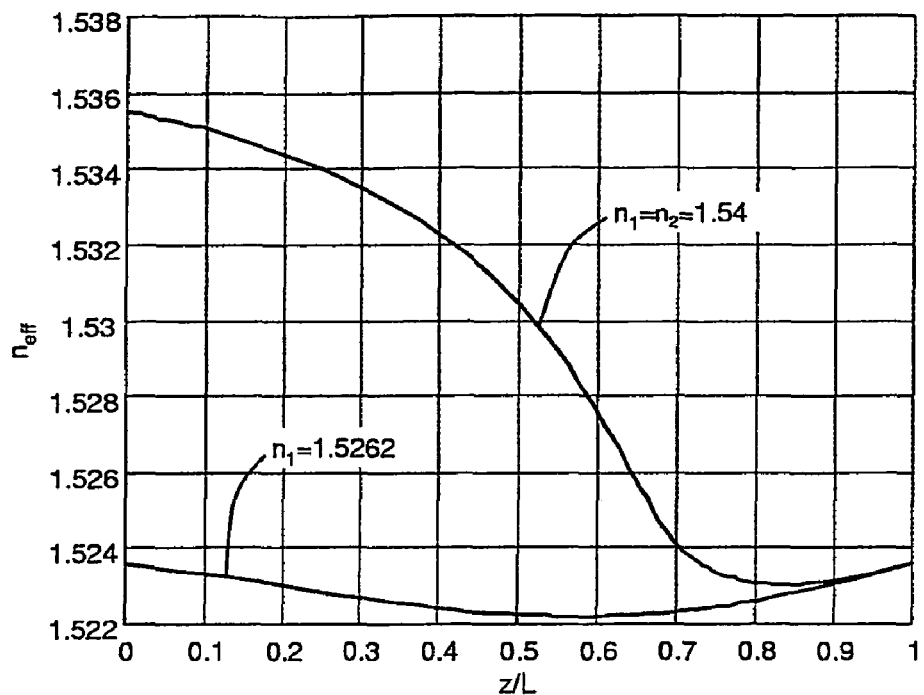
in FIG. 10 a graph with the evolution of the effective refractive index for the TM mode along the length of the mode converter of FIG. 9a, 9b.

In a series of simulations, Applicant has varied the refractive index $n_1$ of the tapered core of the coupling waveguide to assume the two values of $n_1=n_{1,2}=1.5262$ and $n_1=n_2=2.200$. FIG. 10 shows the evolution along the length of the mode converter of the effective refractive index $n_{eff}$ for the fundamental TM mode at a wavelength of 1550 nm that propagates through the combined waveguide resulting from the superposition of the coupling waveguide and the receiving waveguide, for the two tested values of $n_1$. The lower curve shown in FIG. 10 corresponds to an optimum value of $n_1=n_{1,2}=1.5262$. It can be observed that for $n_1=n_{1,2}=1.5262$, the effective refractive index $n_{eff}$ for the propagating fundamental TM mode at the input of the combined waveguide (i.e., at the input of the coupling waveguide) assumes a value of about $n_{1eff}=1.5236$ that is substantially equal to the value of the effective refractive index $n_{2eff}$ for the propagating fundamental mode at the output of the combined waveguide (i.e., at the output of the receiving waveguide). From FIG. 10 it can be seen that, for $n_1=n_{1,2}=1.5262$, the maximum excursion of the effective refractive index $n_{eff}$ for the fundamental mode propagating along the combined waveguide is of about $\Delta_{mM}=0.0012$. For comparison, the difference $(n_2-n_{2eff})$ between the core and the effective refractive index of the receiving waveguide is, in the case of this example, of about 0.016, so that $\Delta_{mM}$ corresponds to slightly less than 10% of $(n_2-n_{2eff})$.

Figure 11:
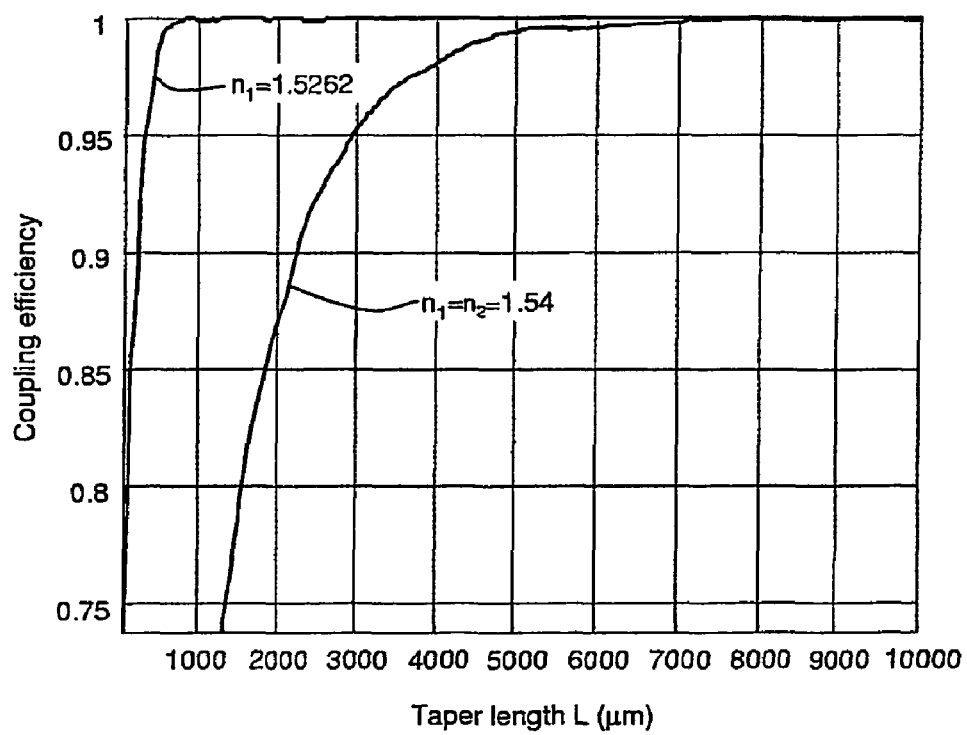
in FIG. 11 a graph with the coupling efficiency between a coupling waveguide and a receiving waveguide as a function of the length L of the tapered waveguide of the mode converter of FIG. 9a, 9b.

FIG. 11 plots the coupling efficiency between the coupling waveguide and the receiving waveguide as a function of the length L of the tapered waveguides.

It can be seen from FIG. 11 that the upper curve, corresponding to $n_1=n_{1,2}=1.5262$, gives a much higher coupling efficiency than the lower curve, corresponding to a value of a value of $n_{1eff}$ outside a range $n_{2eff}\pm 2\,\Delta_{mM}$. Moreover, for $n_1=n_{1,2}=1.5262$ a coupling efficiency greater than 0.95 (corresponding to a coupling loss of less than 0.2 dB) is achieved for a length L of the mode converter of about 300 μM or greater. For the remaining value of $n_1$, outside the above optimum range, a corresponding coupling efficiency can be achieved only for a device length of about 3.6 mm.

The results of the above examples relate to the propagation of the fundamental TM mode in the combined waveguide of the mode converter. The mode converter of the invention lacks cylindrical symmetry, in view of the "side" coupling between the coupling waveguide and the receiving waveguide. A layout of the coupling waveguide and receiving waveguide according to the above examples can have good coupling properties for one of the two polarization modes (e.g., the TM mode) but not necessarily for the other polarization mode (e.g., the TE mode). Applicant has determined that for a layout according to the above examples, if $$|n_{2eff\,TE}-n_{2eff\,TM}|>\Delta_{mM}$$

it will in general not be possible to find a value of $n_1$ for the refractive index of the core of the coupling waveguide satisfying the criterion of the invention for both polarization modes.

A compromise in this case would be a selection of $n_1$ such that $$<n_{1eff}>=<n_{2eff}>\pm(\Delta_{mMTE}+\Delta_{mMTM})$$

with the mean effective index defined as $<n_{1,2eff}>=(n_{2eff\,TE}+n_{2eff\,TM})/2$, the suffix TE or TM corresponding to each of the two polarization modes.

Figure 12:
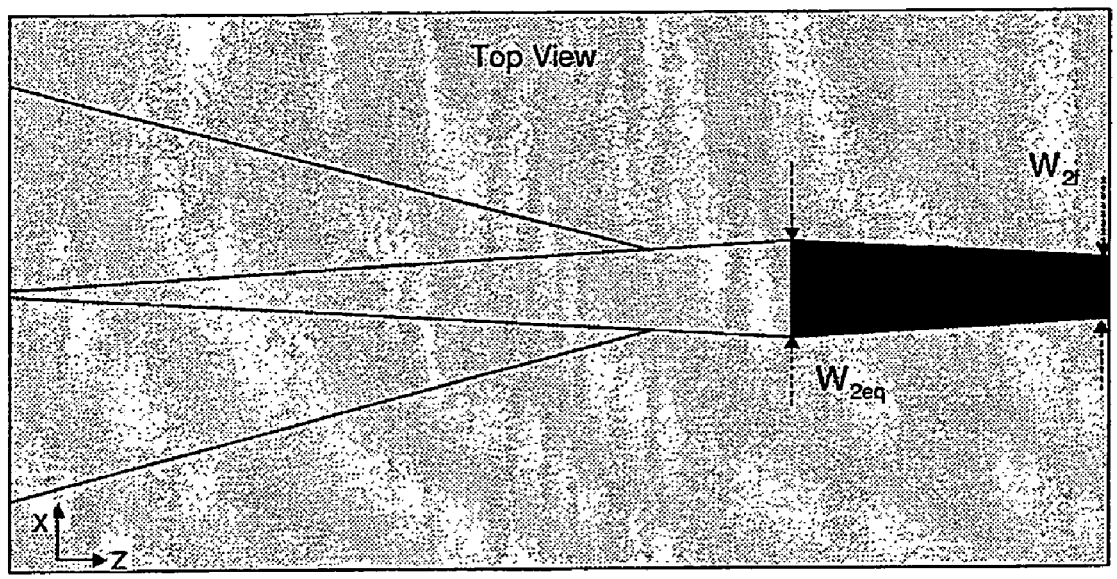
in FIG. 12 a top view of an embodiment of a mode converter according to the invention having a low-polarization sensitivity.
Figure 17:
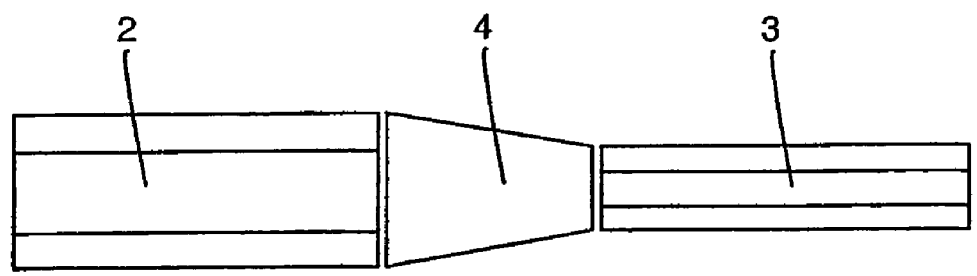
in FIG. 17 a schematic top view of an optical coupling device for coupling two dissimilar waveguides.

An alternative approach to reduce the polarization sensitivity of the tapered structure can be found by noting that, for a given receiving waveguide according to the above layouts whose width $W_2$ is tapered in from 0 to a final value $W_{2f}$, there is a width $W_{2eq}$ such that $n_{2effTE}=n_{2effTM}$. In general $W_{2eq}$ may be greater or smaller than $W_{2f}$. The coupling region between the coupling waveguide and the receiving waveguide can be extended, as schematically shown in a top view in FIG. 12, to cover the length of the receiving waveguide up to the point where it reaches a width $W_{2eq}$. In practice, this means that the coupling waveguide is tapered from its maximum width at its input end to a width of about 0 at a position corresponding to a width of $W_{2eq}$ for the receiving waveguide. The portion of the receiving waveguide downstream of that position is tapered (in or out) until a width of $W_2=W_{2f}$ is reached.

The above examples refer to a planar mode converter exploiting a buried waveguides (examples 1 to 3). Further examples of planar waveguides are shown in the following.

FIGS. 13a and 13b respectively show a front view of the input surface (z=0) and of the output surface (z=L) of a mode converter with a rib receiving waveguide. A coupling waveguide core 131 tapers down its width from a maximum value at the input end (z=0) to about zero at the end of the coupling portion (z=L). A receiving waveguide core layer 132 of uniform thickness is arranged above the core 131. A tapered rib 133 of the receiving waveguide is arranged over core layer 132, to provide lateral guidance to the receiving waveguide. The taper has a minimum width of about 0 at the input end of the mode converter. A cladding 134 is arranged underneath and on the sides of the coupling waveguide core 131, as well as above and on the sides of the tapered rib 133.

According to an alternative, shown in FIGS. 14a and 14b, the receiving waveguide core layer 132 is itself tapered from a minimum value of about 0, at the input end of the mode converter, to a maximum value much larger than the tapered rib maximum width.

FIGS. 15a and 15b respectively show a front view of the input surface (z=0) and of the output surface (z=L) of a mode converter with a ridge receiving waveguide. A coupling waveguide core 151 tapers down its width from a maximum value at the input end (z=0) to about zero at the end of the coupling portion (z=L). A receiving waveguide core layer 152 of uniform thickness is arranged above the core 151. A cladding 155 is arranged underneath and on the sides of the coupling waveguide core 151. A cladding layer 153 is arranged above the receiving waveguide core layer 152. On top of cladding layer 153 there is arranged a tapered ridge 154, to provide lateral guidance to the receiving waveguide. The tapered ridge has a minimum width of about 0 at the input end of the mode converter.

According to an alternative, shown in FIGS. 16a and 16b, the receiving waveguide core layer 152 is itself tapered from a minimum value of about 0, at the input end of the mode converter, to a maximum value much larger than the tapered rib maximum width.

The present invention allows to improve the manufacturing process of mode converters because it achieves a limited overall size of the device while being compatible with a constant thickness for each layer.

For example, in the waveguide shown in FIGS. 3a and 3b, it is possible to grow the first layer 32, for example in silica ($SiO_2$) over a silicon substrate 30, to deposit above this layer a hard mask (metal or a dielectric material), to use an organic film sensitive to light (i.e. UV radiation) for the definition of the geometries (the triangular base 43 of coupling waveguide core 41), and to transfer this pattern onto the first layer with a dry etching technique.

The dry etching technique is a particular type of chemical etching where the process gases (i.e. fluorine or chlorine compounds) are in a plasma state. The result is that said process gases are ionized and by means of an electromagnetic field the ions are oriented in a particular direction to have a preferential direction of etching. It is important to use a hard mask to prevent that all the first layer is etched at the same time; the aim is to etch only the region internal to the triangular base geometry in order to dig it into the first layer. The organic film is helpful to define, using the dry etching approach, the selected geometry at first onto the hard mask and, later, from this onto the first layer. At this point we have a triangular-base-shaped cavity into the silica first layer, having a uniform height controlled by the etching time; it is possible to grow the second layer 31, for example a silica nitride layer, and preferably fill the triangular base cavity using a plasma deposition technique. The plasma deposition technique, that is in some respect similar to the dry etching technique, allows to deposit a solid material starting from a liquid source of it (the same material is liquid, it is evaporated and then fixed using the plasma onto the cavity). To obtain a particular refractive index the deposited material has to be baked into a furnace (i.e. an equipment able to have a controlled increase and decrease of temperature). Using again the dry etching process, without masks, it is possible to remove the surplus of the deposited material to have the silica substrate with the base triangular shaped cavity filled with silica nitride and a controlled height layer of silica nitride above. Using a thermal process it is possible to grow a silica top layer and, using an organic mask to define geometries, etching a part of this layer to obtain a ridge. The thermal process is realized by means of a furnace in which there is the possibility to introduce steam and nitrogen for having a high quality silica ($SiO_2$) starting from silicon (Si).

The invention claimed is:

1. An optical mode converter comprising:
   a coupling waveguide having at an input end a first effective refractive index, the coupling waveguide comprising a tapered core of a substantially constant refractive index with a substantially square cross section at the input end having a size that tapers down moving away form the input end, the coupling waveguide having a cladding at least partially surrounding the tapered core; and
   a receiving waveguide having a second effective refractive index at an output end, comprising a core of a substantially constant refractive index greater than the refractive index of the tapered core of the coupling waveguide, and a cladding at least partially surrounding the core, a side surface of the tapered core of the coupling waveguide being optically in contact, in a coupling portion thereof, with the receiving waveguide so as to allow optical coupling between the coupling waveguide and the receiving waveguide,
   wherein the refractive index of the tapered core of the coupling waveguide is selected so that the first effective refractive index and the second effective refractive index differ from each other in absolute value less than 30% of the difference between the core refractive index and the effective refractive index of the receiving waveguide.

2. The optical mode converter according to claim 1, wherein the refractive index of the tapered core is selected so that the first effective refractive index and the second effective refractive index differ from each other in absolute value less than 20% of the difference between the core refractive index and the effective refractive index of the receiving waveguide.

3. The optical mode converter according to claim 2, wherein the refractive index of the tapered core is selected so that the first effective refractive index and the second effective refractive index differ from each other in absolute value less than 10% of the difference between the core refractive index and the effective refractive index of the receiving waveguide.

4. The optical mode converter according to claim 3, wherein the refractive index of the tapered core is selected so that the first effective refractive index is substantially equal to the second effective refractive index.

5. The optical mode converter according to claim 1, wherein the core of the receiving waveguide is tapered over at least a portion that is optically in contact with the coupling portion of the coupling waveguide.

6. The optical mode converter according to claim 5, wherein the tapered core of the receiving waveguide reaches a width at an end of its coupling portion opposite to the input end, such that the effective refractive index of the receiving waveguide at said end of the coupling portion is approximately equal for two orthogonal polarization modes.

7. An optical device comprising an optical mode converter according to claim 1, and a launching waveguide coupled to an input end of said coupling waveguide.

8. The optical device according to claim 7, wherein said launching waveguide is a single mode optical fiber.

9. A method for fabricating an optical tapered waveguide comprising the following steps:
   growing a bottom cladding layer on a substance;
   digging a wedge shape with a predetermined depth into said bottom cladding layer;
   filling said wedge shape with an optical transmissive material having a refractive index so as to form a wedge;
   growing a receiving core above said wedge in a way to optically contact at least partially said core layer with an upper surface of said wedge; and
   growing a top cladding layer on said receiving core,
   wherein the refractive index of the wedge is selected so that a first effective refractive index of a receiving waveguide having said wedge as a core and a second effective refractive index of a waveguide having said receiving core as a core differ from each other in absolute value less than 30% of the difference between the refractive index of said receiving core and the effective refractive index of the receiving waveguide.

10. The method according to claim 9, further comprising the step of growing a ridge on the top of the top cladding layer.

* * * * *